United States Patent
Hayakawa et al.

(10) Patent No.: US 9,748,543 B2
(45) Date of Patent: Aug. 29, 2017

(54) SEPARATOR FOR NONAQUEOUS CELL AND NONAQUEOUS CELL

(71) Applicant: KURARAY CO., LTD., Kurashiki-shi (JP)

(72) Inventors: Tomohiro Hayakawa, Okayama (JP); Hiroyuki Kawai, Okayama (JP); Hideo Hayashi, Okayama (JP); Koichi Kambe, Osaka (JP)

(73) Assignee: KURARAY CO., LTD., Kurashiki-shi (JP)

(*) Notice: Subject to any disclaimer, the term of this patent is extended or adjusted under 35 U.S.C. 154(b) by 106 days.

(21) Appl. No.: 14/553,563

(22) Filed: Nov. 25, 2014

(65) Prior Publication Data

US 2015/0079479 A1    Mar. 19, 2015

Related U.S. Application Data

(63) Continuation of application No. PCT/JP2013/064669, filed on May 27, 2013.

(30) Foreign Application Priority Data

May 28, 2012    (JP) ................ 2012-121113
Sep. 26, 2012    (JP) ................ 2012-211603

(51) Int. Cl.
| | | |
|---|---|---|
| H01M 2/16 | (2006.01) | |
| H01M 2/14 | (2006.01) | |
| H01M 2/18 | (2006.01) | |
| B29K 29/00 | (2006.01) | |

(52) U.S. Cl.
CPC ......... *H01M 2/1626* (2013.01); *H01M 2/145* (2013.01); *H01M 2/162* (2013.01); *H01M 2/1633* (2013.01); *H01M 2/18* (2013.01); *B29K 2029/04* (2013.01); *B29K 2229/04* (2013.01)

(58) Field of Classification Search
CPC ............ H01M 2/1211; H01M 2/1252; H01M 2/0212; H01M 2/1223; H01M 2/08; H01M 2/12; H01M 2/1626; H01M 2/162; H01M 2/145; H01M 2/18; B29K 2229/04; B29K 2029/04
See application file for complete search history.

(56) References Cited

U.S. PATENT DOCUMENTS

| | | | | |
|---|---|---|---|---|
| 3,915,750 A | * | 10/1975 | Uetani ............... | H01M 2/14 429/135 |
| 4,421,834 A | | 12/1983 | Zupancic | |
| 5,041,104 A | * | 8/1991 | Seal .................. | D04H 1/435 428/213 |
| 5,356,572 A | * | 10/1994 | Takai ................ | D01F 6/24 264/172.15 |
| 5,624,771 A | | 4/1997 | Sano et al. | |
| 6,074,523 A | | 6/2000 | Mizobuchi et al. | |
| 6,607,995 B1 | * | 8/2003 | Takeuchi ............. | A41D 27/02 442/203 |
| 7,170,739 B1 | | 1/2007 | Arora et al. | |
| 7,510,806 B2 | | 3/2009 | Yoshimura et al. | |
| 8,477,480 B2 | | 7/2013 | Hayakawa et al. | |
| 8,802,271 B2 | | 8/2014 | Hayakawa et al. | |
| 8,865,336 B2 | | 10/2014 | Hayakawa et al. | |
| 9,005,820 B2 | | 4/2015 | Sugimoto et al. | |
| 9,142,816 B2 | | 9/2015 | Hayakawa et al. | |
| 2003/0096171 A1 | | 5/2003 | Thrasher et al. | |
| 2004/0234863 A1 | | 11/2004 | Yoshimura et al. | |
| 2006/0014080 A1 | * | 1/2006 | Kubo .................. | D21H 27/00 429/255 |
| 2008/0241662 A1 | | 10/2008 | Kawachi et al. | |
| 2009/0214846 A1 | * | 8/2009 | Kalbe ................. | A41D 27/26 428/219 |
| 2010/0080988 A1 | * | 4/2010 | Hayakawa ............. | C09J 7/04 428/343 |
| 2010/0310921 A1 | | 12/2010 | Hayakawa et al. | |
| 2011/0081583 A1 | | 4/2011 | Sugimoto et al. | |
| 2011/0206972 A1 | | 8/2011 | Hashimoto et al. | |
| 2012/0164514 A1 | | 6/2012 | Hayakawa et al. | |
| 2013/0149614 A1 | | 6/2013 | Kubo et al. | |
| 2013/0183569 A1 | | 7/2013 | Hayakawa et al. | |

FOREIGN PATENT DOCUMENTS

| | | |
|---|---|---|
| CN | 1551400 A | 12/2004 |
| CN | 101573810 A | 11/2009 |
| CN | 101924242 A | 12/2010 |
| JP | S43-27546 | * 11/1968 |
| JP | 48-83334 A | 11/1973 |

(Continued)

OTHER PUBLICATIONS

Sekisui-Selvol (product literature, printed Jun. 20, 2016 http://www.sekisui-sc.com/wp-content/uploads/SelvolPVOH_Brochure_EN.pdf).*
Technoclip (Cellophane Film, Wayback online Sep. 30, 2011).*
Merriam Webster (https://www.merriam-webster.com/dictionary/break with WAYBACKmachine evidence Dec. 23 2005).*
International Search Report issued in PCT/JP2013/064669 dated Jul. 16, 2013.
Extended European Search Report issued Dec. 4, 2015 in Patent Application No. 13797924.1.
Combined Chinese Office Action and Search Report issued Apr. 12, 2016 in Patent Application No. 201380028335.8 (with English translation of Search Report).

(Continued)

*Primary Examiner* — Patrick Ryan
*Assistant Examiner* — Aaron Greso
(74) *Attorney, Agent, or Firm* — Oblon, McClelland, Maier & Neustadt, L.L.P.

(57) ABSTRACT

Provided are a separator for a nonaqueous cell that has air permeability and is small in thickness while maintaining strength properties; and a nonaqueous cell having this separator. The separator includes a fiber sheet in which a polyvinyl alcohol fiber is incorporated in a proportion of 30% or more by mass (based on the fiber sheet). The fiber has a fiber breaking temperature in heated water of lower than 100° C. and higher than 85° C.

15 Claims, No Drawings

(56) References Cited

FOREIGN PATENT DOCUMENTS

| | | | | |
|---|---|---|---|---|
| JP | 59-014260 | 1/1984 | | |
| JP | 1-320755 | 12/1989 | | |
| JP | 5-247882 | 9/1993 | | |
| JP | 08-031429 | 2/1996 | | |
| JP | H09-213296 | * 8/1997 | ............. | H01M 2/16 |
| JP | 10-172532 | 6/1998 | | |
| JP | 10-223196 | 8/1998 | | |
| JP | 10-256088 A | 9/1998 | | |
| JP | 10-284038 | 10/1998 | | |
| JP | 3661104 | 4/2005 | | |
| JP | 2006-229092 A | 8/2006 | | |
| JP | 2007-208043 A | 8/2007 | | |
| JP | 2008-269795 | 11/2008 | | |
| JP | 2009-123399 | 6/2009 | | |
| JP | 4922664 | 2/2012 | | |
| JP | 2012-054228 | 3/2012 | | |
| JP | 2012-109268 | 6/2012 | | |
| WO | WO 2008/075457 | 6/2008 | | |
| WO | WO 2011/033975 | 3/2011 | | |
| WO | WO 2012/036025 A1 | 3/2012 | | |

OTHER PUBLICATIONS

Extended European Search Report issued Aug. 5, 2016 in Patent Application No. 13866727.4.
Japanese Office Action issued Sep. 13, 2016 in Patent Application No. 2014-518434.
Office Action dated Jan. 3, 2017 issued in corresponding Chinese patent application No. 201380067964.1.
Non-Final Office Action dated Mar. 14, 2017 issued in related U.S. Appl. No. 14/750,063.
Office Action dated Jun. 20, 2017 issued in corresponding Korean patent application No. 10-2015-7019417 (with English summary).

* cited by examiner

SEPARATOR FOR NONAQUEOUS CELL AND NONAQUEOUS CELL

CROSS REFERENCE TO THE RELATED APPLICATION

This application is a continuation application, under 35 U.S.C. §111(a), of international application No. PCT/JP2013/064669, filed May 27, 2013, which claims priority to Japanese Patent Application No. 2012-121113, filed on May 28, 2012, and Japanese Patent Application No. 2012-211603, filed on Sep. 26, 2012, the entire disclosures of which are herein incorporated by reference as a part of this application.

FIELD OF THE INVENTION

The present invention relates to a separator for a nonaqueous cell which is useful as a constituent of the cell, and to a nonaqueous cell comprising the separator.

A nonaqueous cell, which is also called as a nonaqueous electrolyte cell, is a cell having an electrolytic solution free from water, such as for example, a lithium ion secondary cell. In the present invention, a nonaqueous cell includes both a primary cell and a secondary cell.

BACKGROUND ART

In order to respond to a change for cordless electronic equipment in recent years, nonaqueous cells, such as lithium cells (lithium primary cells) and lithium ion secondary cells, have attracted attention as power sources because these cells are light in weight and give a high electromotive force and a high energy. For example, cylindrical lithium secondary cells are manufactured in large amounts because these cells are used for portable telephones, notebook type personal computer, and others. The production quantity thereof has been increasing year by year. Furthermore, nonaqueous cells also have attracted attention as energy sources for next-generation electric vehicles. The requirements for cells have been increased to output a higher power by a further restraint of the electrical resistance thereof.

A typical electrolytic solution used for such nonaqueous cells has been known such that a solution in which $LiPF_6$, $LiCF_3SO_3$, $LiClO$, $LiBF_4$ or the like is dissolved in an organic solvent, which will be detailed later. When an abnormal current flow is generated in a cell containing the above electrolytic solution due to a short circuit or a wrong connection between, for example, positive and negative electrodes, there is a possibility that the cell produces remarkable increase in temperature in connection with the abnormal current flow. When the cell causes such an increase in temperature, an attempt has been proposed to make a portion of a separator of the cell melt so as to prevent such a short circuit or wrong connection (see, for example, Patent Document 1).

Hitherto, as a material constituting a separator for a nonaqueous cell, glass fibers and regenerated cellulose have been studied because glass fibers have heat resistance and endurance and are capable of being fine fibers and regenerated cellulose is capable of being refined or beaten. However, glass fibers lack self-bondability, and are unable to be expected to have a high strength caused by entanglement between fibers. Accordingly, studies on various binders have been made in order to improve the strength of aggregate of glass fibers (see, for example, Patent Documents 2 to 5). On the other side, although regenerated cellulose can gain strength by advancing the refinement or beating thereof, investigations have been made about balance between the strength and other performances of aggregate of regenerated cellulose fibers (see, for example, Patent Documents 6 and 7).

PATENT DOCUMENTS

[Patent Document 1] WO 2011/033975 Pamphlet
[Patent Document 2] JP Laid-Open Patent Publication No. S59-014260
[Patent Document 3] JP Laid-Open Patent Publication No. H08-031429
[Patent Document 4] JP Laid-Open Patent Publication No. H10-284038
[Patent Document 5] Japanese Patent No. 4922664
[Patent Document 6] Japanese Patent No. 3661104
[Patent Document 7] JP Laid-Open Patent Publication No. H10-223196

SUMMARY OF THE INVENTION

Problems to be Solved by the Invention

As a separator it is required to have a determined performance of strength properties (such as tensile strength and piercing strength), as well as to be small in thickness and to have air permeability (porousness, ion permeability). However, paper comprising glass fibers and paper consisting of beaten regenerated cellulose fail to satisfy the performances described above with good balance because these papers inevitably have a large thickness to comply with the determined strength properties.

The inventors have recognized, as a theme to be achieved, the acquirement of a fiber sheet usable as a separator for a nonaqueous cell, which has a small thickness, is excellent in strength properties, and has air permeability. The inventors have then made intensive studies to achieve the present invention.

Means for Solving the Problems

A first aspect of the present invention is a separator for a nonaqueous cell comprising a fiber sheet which comprises a polyvinyl alcohol fiber (fiber A) in a proportion of 30% or more by mass (based on the fiber sheet), the fiber A having a fiber breaking temperature in heated water of lower than 100° C. and higher than 85° C.

In the above-mentioned separator for a nonaqueous cell, preferably the fiber sheet further comprises a polyvinyl alcohol fiber (fiber B) having a fiber breaking temperature in heated water of lower than 80° C.

In the nonaqueous cell separator, preferably the fiber sheet further comprises a glass fiber in combination with the fiber A, or with the fibers both A and B.

In the nonaqueous cell separator, the glass fiber is preferably a pulverized glass fiber to have a maximum fiber diameter of 30 μm or less, and an average fiber diameter of 0.1 to 1.0 μm; and the fiber sheet preferably comprises the glass fiber in a proportion of 20 to 50% by mass (based on the fiber sheet as 100% by mass).

Where the separator for a nonaqueous cell includes a glass fiber, the separator preferably has a thickness of 9 to 30 μm, a density of 0.6 to 1.0 $g/cm^3$, and a strength of 0.6 kg/15 mm or higher in a longitudinal direction of the separator (MD direction based on the fiber sheet)."

The pulverized glass fiber is preferably a physically pulverized glass fiber. The pulverized glass fiber is also preferably a wet pulverized glass fiber.

In the nonaqueous cell separator, preferably the fiber sheet further comprises a cellulose fiber in combination with the fiber A, or with the fibers A and B.

The cellulose fiber is preferably a beaten product of an organic-solvent-spun cellulose fiber or a beaten product of a natural cellulose fiber.

Where the separator for a nonaqueous cell includes cellulose fibers, the separator preferably satisfies the following requirements (1) and (2):

(1). the thickness of the separator being within the range from 5 to 30 μm, and (2). "the strength (kg/15 mm) in the longitudinal direction of the separator"/"the thickness (μm) thereof">0.05.

A second aspect of the present invention is a nonaqueous cell comprising the above-mentioned separator for the nonaqueous cell.

Any combination of at least two of subject matters described in the claims and/or disclosed in the specification is included in the present invention. In particular, any combination of two or more of the respective subjected matters described in the claims is included in the present invention.

Effects of the Invention

According to the present invention, since the separator for a nonaqueous cell is formed from a fiber sheet comprising a specific polyvinyl alcohol fiber (fiber A) having a fiber breaking temperature in heated water of lower than 100° C. and higher than 85° C. in a proportion of 30% or more by mass (based on the fiber sheet), such characteristics of the fiber sheet makes it possible to obtain a fiber sheet in which fibers still having a fiber form can generate bonding at crossing points thereof. The obtained fiber sheet is extremely useful as a separator because the fiber sheet is capable of achieving a small thickness while maintaining strength properties derived from fiber strength as well as has an air permeability (ion permeability) due to the presence of voids between the fibers so as to achieve a low resistance.

Furthermore, in a fiber sheet further comprising a polyvinyl alcohol fiber (fiber B) having a fiber breaking temperature in heated water of lower than that of the fiber A, the fiber B exhibits a binder function so as to make it possible to attain stronger bonding between fibers at crossing points.

Furthermore, when a glass fiber, in particular, a pulverized glass fiber to have a specific fiber diameter is blended with the fiber A, or with the fibers A and B in a proportion of 20 to 50% by mass (based on the fiber sheet) to form a sheet, the resultant separator for a nonaqueous cell is excellent in strength properties, and further attains blocking performance as well as smaller thickness.

Furthermore, when the separator formed by the addition of the glass fiber has three requirements described below, it is possible to make the separator to have a good balance between thickness/density and mechanical strength.

(i) The separator has a thickness of 9 to 30
(ii) The separator has a density of 0.6 to 1.0 g/cm$^3$.
(iii) The separator has a strength (kg/15 mm) of 0.6 kg/15 mm or more in the longitudinal direction thereof.

When a cellulose fiber, in particular, a beaten cellulose is added to the fiber A, or to the fibers A and B to form a sheet, the fibrillated fibers in the sheet can increase entanglement between fibers so as to improve flexibility of the sheet as well as to realize an appropriate blocking performance.

When the separator comprising the cellulose fiber attains two requirements described below, the separator can achieve a good balance between thickness and mechanical strength.

1. The separator has a thickness in the range of 5 to 30 μm.
2. The separator has a value >0.05, the value being the ratio of "the strength (kg/15 mm) in the longitudinal direction of the separator"/"the thickness (μm) thereof".

A nonaqueous cell comprising the separator of the first aspect of the present invention has a reduced thickness so as to achieve a decreased distance between its electrodes, and is expected to have a high capacity because of the increased amount of positive and negative electrodes due to reduced thickness of the separator.

DESCRIPTION OF EMBODIMENTS (Fiber Sheet)

In the separator according to the present invention usable for a nonaqueous cell, a fiber sheet constituting the separator is required to comprise a polyvinyl alcohol fiber (fiber A) having a fiber breaking temperature in heated water of lower than 100° C. and higher than 85° C. in a proportion of 30% or more by mass based on the sheet. The fibers having a fiber breaking temperature in heated water of lower than 100° C. can contain or absorb water inside at the time of forming a fiber sheet in a state of water-absorbed mat by a wet-laid method (a sheet-forming method using, for example, a papermaking machine). As a result, such fibers make it possible to obtain a fiber sheet by effective bonding between fibers on their surfaces at their crossing points while maintaining the fiber structure in the subsequent heat-drying process. If the fiber breaking temperature in heated water of the fiber is 100° C. or higher, the fiber surfaces are too stable to cause point bonding between fibers at their crossing points, resulting in failing to form a fiber sheet. On the other hand, if the fiber breaking temperature in heated water of the fiber is 85° C. or lower, the polyvinyl alcohol constituting the fibers in the water-absorbed mat is dissolved at the heating and drying step, so that the formation of a fiber sheet becomes difficult. It is preferred to form a dry fiber sheet with a polyvinyl alcohol fiber having a fiber breaking temperature in heated water of lower than 98° C. and higher than 90° C.

The present invention is characterized by forming a sheet with polyvinyl alcohol fibers (fiber A) having a fiber breaking temperature in heated water of lower than 100° C. and higher than 85° C. In this case, the polyvinyl alcohol fiber works as a subject fiber for forming the sheet, and also has a function as a binder fiber.

(Fiber A)

According to the present invention, the polyvinyl alcohol fiber having a fiber breaking temperature in heated water of lower than 100° C. and higher than 85° C., can be obtained from a polyvinyl alcohol (vinyl alcohol based polymer) having an average polymerization degree of 1000 to 5000 and a saponification degree of 95% or more by mole. As far as the fiber causes breaking in heated water having a temperature in the above-mentioned range, the polyvinyl alcohol may be a copolymer copolymerized with any other copolymerizable component. The copolymerization proportion (proportion of comonomer(s)) is preferably 20% or less by mole, in particular preferably 10% or less by mole from the viewpoint of the fiber-formability (of the copolymer) and mechanical properties of the fiber sheet. It is desired that the polyvinyl alcohol fiber may be an unacetalized fiber in which acetalization reaction such as formalization reaction (FA conversion) is not carried out, or may be an uncrosslinked fiber in which crosslinking treatment is not carried out, in order to maintain fiber-fiber adherence in the formation process of a fiber sheet. Although it is not necessary, the polyvinyl alcohol fiber may consist of a polyvinyl alcohol. The polyvinyl alcohol fiber may contain a different polymer other than a polyvinyl alcohol. Of course, the polyvinyl alcohol fiber may be a composite spun fiber or a blend spun fiber (sea-island conjugate fiber) both of which comprise a polyvinyl alcohol and a polymer(s) other than the polyvinyl alcohol. According to the present invention, since the polyvinyl alcohol fiber preferably has a high tenacity, the polyvinyl alcohol fiber preferably comprises a polyvinyl alcohol in a proportion of 80% by weight or greater. The method for forming the fiber may be any one of wet spinning methods (a sodium sulfate coagulation bath, an alkali coagulation bath, and an organic solvent coagulation bath), dry spinning methods, and dry wet spinning methods. After the spinning, the resultant may be subjected to a hot drawing (wet hot drawing or dry hot drawing), heat setting, or other treatment. By adjusting a draw ratio in hot drawing, a temperature of heat setting and the like, can be obtained a desired polyvinyl alcohol fiber having a fiber breaking temperature in heated water of lower than 100° C. and higher than 85° C. Such a polyvinyl alcohol fiber is also commercially available, for example, as a product having a trade name "VN 20200" from Kuraray Co., Ltd.

The single fiber fineness of the fiber may be 3.3 dtex or less, preferably 1.1 dtex or less, more preferably 0.8 dtex or less in order to improve the separator performance and thinning property of the fiber sheet. The fineness is preferably 0.01 dtex or more, more preferably 0.1 dtex or more from the viewpoint of the paper-making property of the fiber and the reduction in internal pressure in the cell. The fiber length may be appropriately determined in accordance with the single fiber fineness. From the viewpoint of the paper-making property of the fiber, the fiber length is preferably from 0.5 to 10 mm, and particularly preferably from 1 to 5 mm.

(Fiber B)

According to the present invention, a polyvinyl alcohol fiber (fiber B: also referred to as polyvinyl alcohol binder fiber) having a fiber breaking temperature in heated water of lower than 80° C. is preferably used in combination with the fiber A in order to enhance bonding between fibers and improve fiber sheet performance. The fiber B has a property as a binder fiber (a property to capable of adhering or bonding fibers A to each other by melt-bonding under heating in the wet-laid fiber sheet formation process and a subsequent heat-drying process). The polyvinyl alcohol binder fiber suitable for the enhancement preferably has a fiber breaking temperature in heated water of higher than 60° C. and lower than 80° C., more preferably from 70° C. to 80° C. The fiber B is preferably a fiber of a polyvinyl alcohol having an average polymerization degree of about 500 to 3000, and a saponification degree of 95 to 99% by mole. Of course, the fiber B may be a composite spun fiber or a blend spun fiber (sea-island conjugate fiber) both of which comprise a polyvinyl alcohol and a polymer(s) other than the polyvinyl alcohol. The fiber B is preferably a polyvinyl alcohol fiber comprising a polyvinyl alcohol in a proportion of 30% by weight or more, preferably 50% by weight or more, more preferably 80% by weight or more from the viewpoint of the electrolytic solution absorptivity, the mechanical performance and so on.

The polyvinyl alcohol binder fiber can be produced in the following manner, i.e., after spinning a fiber in the same manner as in the fiber A, the fiber is subjected to a hot drawing and a heat setting conducting at a lower extent than that of fiber A so as to obtain a polyvinyl alcohol fiber having a fiber breaking temperature in heated water described above. The fiber B preferably has a fineness from about 0.01 to 3 dtex, more preferably from 0.1 to 2.5 dtex from the viewpoint of the water dispersibility, the adhesiveness to other components, the appropriate size of voids, and others. The fiber B preferably has a fiber length of about 1 to 5 mm. The polyvinyl alcohol binder fiber is commercially available as, for example, a product having a trade name "VPB 101", or "VPB 041" manufactured by Kuraray Co., Ltd.

Where the fiber B is added as a binder component to the separator for a nonaqueous cell in the present invention, the blend proportion thereof is preferably from 3 to 20% by mass based on the fiber sheet. If the amount of the fiber B is less than 3% by mass, a required binder effect may be insufficiently expressed. If the amount is more than 20% by mass, voids between fibers may be unfavorably filled up resulting in reduction in air permeability.

(Glass Fiber)

According to the present invention, a glass fiber may be used in combination with the fiber A, or with the fibers A and B to form a fiber sheet. The glass fiber is not particularly limited to a specific one, and may preferably be a pulverized glass fiber having a maximum fiber diameter of 30 μm or less and an average fiber diameter of 0.1 to 1.0 μm. The fiber sheet is preferably formed by blending such a fiber in a proportion of 20 to 50% by mass.

The glass fiber having a maximum diameter of more than 30 μm may be deteriorated in obtaining a fiber sheet having a predetermined thin thickness or thinner. The maximum diameter is preferably 20 μm or less, more preferably 10 μm or less.

The glass fiber having an average fiber diameter of less than 0.1 μm may have a tendency that the glass fibers drop off from a sheet-making net in the sheet forming process due to too small fineness of the fiber, resulting in lower yield of the sheet. The glass fiber having an average fiber diameter of more than 1.0 μm may generate a large size of voids between fibers in the separator so as to fail to obtain sufficient blocking performance as a separator for a cell. The average fiber diameter is preferably from 0.2 to 0.8 μm, more preferably from 0.3 to 0.7 μm.

The freeness of the glass fiber after pulverizing treatment may be 100 mL or more, more preferably 200 mL or more. If the freeness is less than 100 mL, the pulverization may be insufficient.

If the blend proportion of the glass fiber is less than 20% by mass, the blocking performance of the separator tends to deteriorate. If the proportion of the glass fiber is more than 50% by mass, the strength of the separator tends to lower. The proportion of the glass fiber is preferably from 25 to 45% by mass, more preferably from 30 to 40% by mass.

The glass fiber used for the fiber sheet in the present invention is not particularly limited to a specific one, and is preferably obtained by subjecting a commercially available glass fiber having a fiber diameter of 0.1 to 1.0 μm to a pulverizing treatment. It is preferred to remove fibers having a fiber diameter of 30 μm or more, which are contained as shots.

The method for the pulverizing treatment may be a physical pulverizing method, and examples of pulverizing method may include a pulverizing mill conducing the pulverizing treatment in a container filled with ceramic spheres, or others; a pulverizing with a mixer conducing the pulverizing treatment with rotary blades; a pulverizing with a refiner conducing the pulverizing treatment by grinding fibers between discs; and others. The preferable pulverizing method may include a wet pulverizing method in which fibers were pulverized in a slurry form. Before pulverizing treatment, after pulverizing treatment, or before and after pulverizing treatment, a removing process may be conducted to remove fibers having a fiber diameter of 30 µm or more, which are contained as shots, by a centrifugal method.

(Cellulose Fiber)

The fiber sheet according to the present invention may comprise a cellulose fiber to be added for forming a sheet. The cellulose fiber may be, for example, an organic-solvent-spun cellulose fiber obtained by dissolving cellulose in an organic solvent such as aminoxide, and then spinning the solution; a regenerated cellulose fiber; a natural cellulose fiber, such as a wood pulp that may be of various types, or cotton linter; or a mercerized product or beaten product of any one of these fibers. Particularly preferred one is a beaten product of an organic-solvent-spun cellulose fiber, or a beaten product of natural cellulose in order to form a fiber sheet having a network structure caused by entanglement of fibrillated fibers.

According to the present invention, by adding the cellulose fiber to a fiber A, or fibers comprising fibers A and B, the entanglement between fibrillated fibers is introduced into a fiber sheet so as to obtain a sheet having flexibility and blocking performance.

Conventionally, a paper sheet consisting of cellulose fibers has been used as a cell separator. However, such a paper separator has a problem that the air permeability of the sheet comes to deteriorate when the sheet has a more dense structure to gain predetermined strength properties. In contrast, in the present invention, by using a specific polyvinyl alcohol fiber as main fibers constituting the separator, can be obtained a separator having a good balance between mechanical properties, thickness, air permeability/resistance, and others. Additionally, by further adding a cellulose fiber, can be obtained a sheet having flexibility and achieving blocking property so as to give an improved separator. The cellulose fiber added into the fiber sheet is contained in a proportion of preferably less than 70%, more preferably less than 60%, even more preferably less than 50% by mass based on the fiber sheet. The cellulose fiber to be used preferably has a fineness of 0.5 to 2.0 dtex and/or a fiber length of 1 to 5 mm. The beating degree thereof is preferably 100 mL or less, and more preferably 50 mL or less.

(Formation of Fiber Sheet)

The separator of the present invention can be formed of a fiber sheet, for example, a wet nonwoven fabric, by using a fiber A as described above, preferably by using a fiber A in combination with a fiber B, further preferably by using a fiber A in combination with a glass fiber or cellulose fiber, optionally with a fiber B. The method for producing the wet nonwoven fabric is not particularly limited to a specific one. For example, a desired wet nonwoven fabric can be effectively produced, by using an ordinary wet papermaking machine. Examples of a papermaking net used therein include a cylindrical net, a tanmo net, and a Fourdrinier net. The papermaking net may be used alone to form a single layer. Alternatively, a combination of the papermaking nets may be used to form a plurality of layers. The paper sheet preferably has a plurality of layers obtained by using the combination of a plurality of paper-making nets in order to obtain a paper having a uniform texture and being excellent in electrical properties. The particularly preferred paper sheet is a bilayer sheet by obtained by using a combination of tanmo/cylinder papermaking machines. After the papermaking with the wet papermaking machine, the obtained undried nonwoven mat is dried with a dryer (for example, Yankee type dryer) to produce a target separator for a nonaqueous cell. If necessary, after drying with heating, the separator may be optionally subjected to heat press processing or other processing. Furthermore, the separator may be subjected to a hydrophilic treatment, such as surfactant treatment, in order to improve electrolyte absorption capacity of the separator.

(Separator Characteristics)

Any separator for a nonaqueous cell needs to have a tensile strength [in the longitudinal (lengthwise direction) of the fiber sheet] required for the separator to have a processability such as to be attached to the cell, and/or a piercing strength resisting against contact with the active material, and others. The separator is preferably a separator having a porous structure (air permeability) to ensure ion permeability. The separator desirably has a smaller thickness from the viewpoint of containing a larger quality of electrode materials in a predetermined volume of the cell. Although the strength properties conflicts with the good air permeability and the small thickness in the separator, since the fiber sheet according to the present invention is formed by using a polyvinyl alcohol fiber having a fiber breaking temperature in heated water of lower than 100° C. and higher than 85° C., such a fiber sheet make it possible to bond (point-bonding) fibers at their crossing points while the fiber sheet maintains fiber structure. As a result, with taking advantage of a high tenacity of the polyvinyl alcohol fiber, can be obtained a fiber sheet having desired performances with a small basis weight (or mass per unit area).

Specifically, in the case where a separator is formed using the cellulose fiber added to the fiber A, or to the fibers A and B, the thickness of the separator is preferably from 5 to 30 µm, and the ratio of the tensile strength (kg/15 mm) of the separator in the longitudinal direction of the fiber sheet with respect to the thickness (µm) of the separator preferably satisfies an expression described below. According to the present invention, separators satisfying these requirements can be obtained, as described in Examples, which will be described later.

"Tensile Strength (kg/15 mm) of the separator (fiber sheet) in the longitudinal direction"/"the thickness (µm) of the separator">0.05.

More preferably, the expression >0.10.

In the case where the separator is a separator comprising a glass fiber in combination with a fiber A, or in combination with fibers A and B, specifically, the thickness of the separator is preferably from 9 to 30 µm, the density is preferably from 0.6 to 1.0 g/cm$^3$, and the tensile strength (kg/15 mm) in the longitudinal direction of the separator is preferably 0.6 or more, which is necessary for the processability of the separator in the process of cell fabrication. In the fabricated cell, since the separator is sandwiched between electrodes of the cell, the longitudinal tensile strength (kg/15 mm) of the separator is preferably 0.04 or more in the state that electrolytic solution is immersed in the separator. The separator having a strength of less than 0.04 may fail to keep its shape by impact or vibration to the separator. According to the present invention, separators satisfying these requirements can be obtained, as demonstrated in Examples, which will be described later.

(Nonaqueous Cell)

A nonaqueous cell using the separator of the present invention comprises a positive electrode, a negative electrode, a nonaqueous electrolytic solution, and the separator. If required, the nonaqueous cell may include other member(s) used ordinarily in the technical field of nonaqueous cells. The shape of the nonaqueous cell of the present invention is not particularly limited to a specific one, and may be various shapes, such as coin, button, paper sheet, cylindrical and square shapes.

(Positive Electrode)

As an active material for the positive electrode of a primary nonaqueous cell, preferred examples of include graphite fluoride (CFx), $MnO_2$, $V_2O_5$, $SOCl_2$, $SO_2$, $FeS_2$, CuO, and CuS. Of these examples, graphite fluoride and $MnO_2$ are preferred. As an active material for the positive electrode of a secondary nonaqueous cell, examples thereof include metal oxides such as $V_2O_5$ and $Nb_2O_5$, lithium-containing multiple oxides such as $Li_{(1-x)}NiO_2$, $Li_{(1-x)}MnO_2$, $Li_{(1-x)}Mn_2O_4$, $Li_{(1-x)}CoO_2$, and $Li_{(1-x)}FeO_2$; and polyanion type lithium transition metal compounds such as $LiFePO_4$, and other electro-conductive materials. It should be noted that X in the above examples represents a number from 0 to 1. These positive electrode active materials may be used alone or in any combination of two or more thereof. Of these examples, from the viewpoint of high energy density and safety, preferred one includes $Li_{(1-x)}CoO_2$, $Li_{(1-x)}NiO_2$, and $Li_{(1-x)}MnO_2$, and particularly preferred one includes $LiCoO_2$, $LiNiO_2$, and $LiMn_2O_4$, in which each may have a lamellar structure or a spinel structure.

(Negative Electrode)

The negative electrode contains a negative electrode active material capable of occluding and emitting ions of an alkali metal (such as lithium or sodium) or ions of an alkaline earth metal (such as calcium) as well as a positive electrode active material does. The active material of negative electrode, when it is combined with a positive electrode, is also capable of occluding and emitting ions of the same kind of metal as occluded or emitted in/from the positive electrode at a potential lower than that of the combined positive electrode. From the viewpoint of high cell capacity the negative electrode active material is desirably an active material which occludes and emits lithium ions. Examples of an active material having such properties include a metal lithium, a carbonaceous material (such as an artificial graphite, a natural graphite, a barely graphitized carbon material, and a readily-graphitized and low-temperature-fired carbon material), lithium titanate, an iron sulfide, a cobalt oxide, a lithium-aluminum alloy, a tin oxide, and others. Furthermore, desired one is an active material operable at an operation potential of 0.5 V higher than the potential of metal lithium. The selection of such an active material makes it possible to restrain the precipitation reaction of metal lithium at the time of overcharge, or the charge of overvoltage, so that a higher safety can be realized. From this viewpoint, the negative electrode active material is most desirably lithium titanate. Two or more negative electrode active materials may be used in a mixture form. The shape may be various shapes such as scaly, fibrous and spherical shapes.

(Electrolytic Solution)

Examples of a solvent used for the electrolyte include ethylene carbonate (EC), propylene carbonate (PC), dimethyl carbonate (DMC), methyl ethyl carbonate (MEC), diethyl carbonate (DEC), γ-butyrolactone (BL), acetonitrile (AN), ethyl acetate (EA), toluene, xylene, and methyl acetate (MA). Examples of an alkali metal salt contained in the electrolyte include lithium perchlorate, lithium hexafluorophosphate, lithium tetrafluoroborate, lithium hexafluoroarsenic, lithium trifluoromethylsulfonate, lithium bistrifluoromethylsulfonylimide, lithium bispentafluoroethylsulfonylimide, and other lithium salts.

The electrolyte may be an ionic liquid. When the temperature of the usage environment is 60° C. or lower, use of a cyclic or linear carbonate or lactone, or others makes it possible to form a cell excellent in rate characteristic, charge/discharge cycle characteristic, pulse discharge characteristic and others. In contrast, when the highest temperature of the usage environment exceeds 60° C., it is desired to use an ionic liquid free from solvent volatilization as well as inflammation. In this case, the electrolyte is characterized by comprising an ionic liquid and an alkali metal salt.

A layered electrode group comprising a positive electrode, a separator and a negative electrode is impregnated a nonaqueous electrolyte to be taken up in the layered electrode group. The resultant is held into a container to form a cell.

EXAMPLES

The separator according to the present invention will be specifically described by way of examples thereof. However, the invention is not limited to these examples. In each of the examples, individual physical properties thereof were measured as follows:

<Fiber Breaking Temperature of Polyvinyl Alcohol Fiber in Heated Water (° C.)>

A weight giving a load of 0.9 gf/500 dtex was connected to a polyvinyl alcohol fiber tow having a test length of 5 cm used as a sample. The sample was hung in water (20° C.) of 500 cc, and the water temperature was increased at a temperature-increasing rate of 1° C./minute. The temperature at which the fiber tow was dissolved to be broken was defined as the fiber breaking temperature in heated water of the sample.

<Beating Degree>[(Freeness) CSF (mL)]

A sample was measured in accordance with the Canadian standard freeness thereof corresponding to JIS P 8121 "Method for measuring the freeness of a pulp".

<Average Fiber Diameter (μm)>

A scanning electron microscope ("S-510" manufactured by Hitachi Ltd.) was used to photograph glass fibers under 5000 magnifications. From the enlarged photograph, 20 fibers were selected at random. The respective fiber diameters thereof were measured, and the average thereof was defined as the average fiber diameter.

<Maximum Fiber Diameter (μm)>

A scanning electron microscope ("S-510", manufactured by Hitachi Ltd.) was used to photograph glass fibers at 10 points under 5000 magnifications. The maximum diameter out of the respective diameters at the 10 photographed points was defined as the maximum fiber diameter.

<Basis Weight>

A test piece of 100 mm×100 mm size is collected from each sample along the longitudinal direction thereof. The mass of the sample piece was measured under the equilibrium state of water therein, and then converted to the mass per $m^2$ to gain the basis weight (mass per unit area) of the sample.

<Thickness (mm) and Density (g/cm³)>

The physical properties of each sample were measured in accordance with JIS P 8118 "Method for testing the thickness and the density of a paper sheet and a paper board".

<Tensile Strength>

The tensile strength in the longitudinal direction of a fiber sheet was measured in accordance with JIS P 8113 "Method for testing the tensile strength of a paper sheet and a paper board".

<Piercing Strength>

Piercing Strength of a sample was measured by using a handy compression tester, KES-G5 (manufactured by KATO TECH CO., LTD.). The sample was fixed to a circular stage having a diameter of 10 mm. A needle of 1 mm in diameter with the tip shape of 0.5 mm R was used to conduct a piercing test. The strength (g) of the pressure at the time was measured.

<Air Permeability ($cc/cm^2/s$)>

A Frajour type tester was used to measure a sample in accordance with JIS L 1096 6.27 "Ordinary fabric testing method; air permeability".

<Impedance (Resistance Value)>

A sample was immersed at 20° C. for 30 minutes in 1% by mole solution of lithium tetrafluoroboron [manufactured by Kishida Chemical Co., Ltd.; 1 mole/L of $LiBF_4$ in EC (ethyl carbonate)/EMC (ethyl methyl carbonate) (ratio by volume: 3/7)]. The sample still retaining the sufficient solution (i.e., the sample in the state that the solution was dropped from the sample for 30 seconds), an impedance meter [KC-547 LCR METER, manufactured by Kokuyo Electric Co., Ltd.] was used to measure the sample.

<Strength of Sample after Having Stored in an Impregnated State with Electrolytic Solution>

A sample cut into a piece 15 mm in width and 170 mm in length was immersed in an electrolytic solution for LIB [manufactured by Kishida Chemical Co., Ltd.; electrolyte: 1 mole/L of $LiBF_6$, and solvent: a mixed solvent in which EC (ethyl carbonate) and EMC (ethyl methyl carbonate) were mixed with each other at a ratio by volume: 3/7)] in a glove box. The sample was put into a sealed vessel, and the vessel was stored in a drying machine set to a temperature of 60° C. for 3 months. After the storage, the tensile strength thereof was measured.

Example 1

The following materials were prepared:

as a constituent fiber 1, a polyvinyl alcohol (PVA) fiber (unformalized fiber) having a fiber breaking temperature in heated water of 95° C., a fineness of 0.3 dtex, and a fiber length of 2 mm (trade name: "VN 20200", manufactured by Kuraray Co., Ltd.);

as a constituent fiber 2, a polyvinyl alcohol (PVA) fiber having a fiber breaking temperature in heated water of 72° C., a fineness of 1.1 dtex, and a fiber length of 3 mm (trade name: "VPB 101", manufactured by Kuraray Co., Ltd.); and as a constituent fiber 3, a beaten product of a solvent-spun cellulose fiber having a fineness of 1.7 dtex and a fiber length of 3 mm (trade name: "Tencel", manufactured by Lenzing AG) in a pulper and a fibrillator to prepare a fibrillated product having a CSF of 10 mL. The constituent fibers 1, 2 and 3 were mixed with each other with blend proportions (% by mass) of 50%, 15%, and 35%, respectively, to obtain a slurry. The slurry was treated with a cylinder papermaking machine to obtain a wet paper, and then dried with a dryer at a temperature of 130° C. Next, the dried paper was heat-pressed with a heat press machine at a temperature of 200° C. under a linear pressure of 100 kgf/cm to give a sheet having a basis weight of 10.3 $g/m^2$, a thickness of 13 µm, and a density of 0.79 $g/m^3$.

Example 2

The beating degree of the constituent fiber 3 was changed from 10 mL in Example 1 to 50 mL. Except for this change, the same constituent fibers 1 and 2 as in Example 1 and the constituent fiber 3 were used to be mixed with each other with blend proportions of 40%, 15%, and 45%, respectively, to prepare a slurry. In the same manner as in Example 1, the slurry was made into a wet paper, and after the papermaking, the wet paper was dried with a dryer and then processed through a heat press machine to produce a sheet having a basis weight of 9.8 $g/m^2$, a thickness of 12 µm, and a density of 0.82 $g/m^3$.

Example 3

The same constituent fibers 1, 2 and 3 as in Example 1 were used to be mixed with each other with blend proportions of 50%, 15%, and 35%, respectively, to prepare a slurry. In the same manner as in Example 1, the slurry was made into a wet paper, and after the papermaking, the wet paper was dried with a dryer and then processed through a heat press machine to produce a sheet having a basis weight of 10.1 $g/m^2$, a thickness of 25 µm, and a density of 0.40 $g/m^3$. The adjustment of the thickness was attained by adjusting the clearance of the heat press machine.

Example 4

The same constituent fibers 1, 2 and 3 as in Example 1 were used to be mixed with each other with blend proportions of 50%, 15%, and 35%, respectively, to prepare a slurry. In the same manner as in Example 1, the slurry was made into a wet paper, and after the papermaking, the wet paper was dried with a dryer and then processed through a heat press machine to produce a sheet having a basis weight of 7.1 $g/m^2$, a thickness of 9 µm, and a density of 0.79 $g/m^3$.

Comparative Example 1

Instead of the respective sheets of Examples 1 to 4, a polyethylene film (basis weight: 9 $g/m^2$, thickness: 20 µm, and density: 0.45 $g/m^3$) was used.

Comparative Example 2

An acetate fiber having a fineness of 1.1 dtex and a fiber length of 3 mm (constituent fiber 1), and the same constituent fibers 2 and 3 as in Example 1 were used to be mixed with each other with blend proportions of 50%, 15%, and 35%, respectively, to prepare a slurry. A cylinder papermaking machine was used to make the slurry into a wet paper. After the papermaking, the wet paper was dried with a dryer and then processed through a heat press machine to produce a sheet having a basis weight of 8 $g/m^2$, a thickness of 20 µm, and a density of 0.40 $g/m^3$.

Comparative Example 3

A polyvinyl alcohol fiber (formalized fiber) having a fiber breaking temperature in heated water of 100° C. or higher, a fineness of 0.3 dtex and a fiber length of 2 mm (trade name: "VN 30200, manufactured by Kuraray Co., Ltd." (constituent fiber 1), and the same constituent fibers 2 and 3 as in Example 1 were used to be mixed with each other with blend proportions of 50%, 15%, and 35%, respectively, to prepare a slurry. A cylinder papermaking machine was used to make the slurry into a wet paper. After the papermaking, the wet paper was dried with a dryer and then processed through a heat press machine to produce a sheet having a basis weight of 10.2 $g/m^2$, a thickness of 15 µm, and a density of 0.68 $g/m^3$.

Comparative Example 4

The beating degree of the constituent 3 was changed from 10 mL in Example 1 to 50 mL. Except this change, the same constituent fibers 1 and 2 as in Example 1 and the constituent fiber 3 were used to be mixed with each other with blend proportions of 20%, 15%, and 65%, respectively, to prepare a slurry. A cylinder papermaking machine was used to make the slurry into a wet paper. After the papermaking, the wet paper was dried with a dryer and then processed through a heat press machine to produce a sheet having a basis weight of 10.3 g/m$^2$, a thickness of 13 μm, and a density of 0.79 g/m$^3$.

Comparative Example 5

The constituent fiber 2 used in Example 1, and a constituent fiber 3 having a beating degree adjusted to 50 mL were used to be mixed with each other with blend proportions of 15% and 85%, respectively, to prepare a slurry. A cylinder papermaking machine was used to make the slurry into a wet paper. After the papermaking, the wet paper was dried with a dryer and then processed through a heat press machine to produce a sheet having a basis weight of 10.3 g/m$^2$, a thickness of 13 μm, and a density of 0.79 g/m$^3$.

Comparative Example 6

A polyvinyl alcohol fiber (unformalized fiber) having a fiber breaking temperature in heated water of 80° C., a fineness of 0.4 dtex and a fiber length of 4 mm is used as a constituent fiber 1. The constituent fiber 1 and the same constituent fibers 2 and 3 as in Example 1 were used to be mixed with each other with blend proportions of 50%, 15%, and 35%, respectively, to prepare a slurry. A cylinder papermaking machine was used to make the slurry into a wet paper. After the papermaking, the wet paper was dried with a dryer. However, because of dissolution of polyvinyl alcohol forming the constituent fibers 1 and 2 in water contained in the wet paper, no formation of sheet was observed.

Table 1 shows formulation of the constituent fibers constituting the sheet in Examples 1 to 4 and Comparative Examples 1 to 6. Table 2 shows performances (the tensile strength, piercing strength, air permeability, resistance value, and tensile strength/thickness ratio) of the sheet in Examples 1 to 4 and Comparative Examples 1 to 6. Table 3 shows strength of each sheet of Example 1 and Comparative Example 4 after having stored in an impregnated state with electrolytic solution.

TABLE 1

| | | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Constituent fiber 1 | | | | | | | | | | | |
| Polymer | | PVA | PVA | PVA | PVA | PE film | Acetate | PVA | PVA | PVA | PVA |
| Fiber breaking temperature in heated water | ° C. | 95 | 95 | 95 | 95 | — | — | 100 or more | 95 | 95 | 80 |
| Fineness | dtex | 0.3 | 0.3 | 0.3 | 0.3 | | 1.1 | 0.3 | 0.3 | 0.3 | 0.4 |
| Fiber length | mm | 2 | 2 | 2 | 2 | | 3 | 2 | 2 | 2 | 4 |
| Blend proportion | % | 50 | 40 | 50 | 50 | | 50 | 50 | 20 | 0 | 50 |
| Constituent fiber 2 | | | | | | | | | | | |
| Polymer | | PVA | PVA | PVA | PVA | | PVA | PVA | PVA | PVA | PVA |
| Fiber breaking temperature in heated water | ° C. | 72 | 72 | 72 | 72 | | 72 | 72 | 72 | 72 | 72 |
| Fineness | dtex | 1.1 | 1.1 | 1.1 | 1.1 | | L1 | 1.1 | 1.1 | 1.1 | 1.1 |
| Fiber length | mm | 3 | 3 | 3 | 3 | | 3 | 3 | 3 | 3 | 3 |
| Blend proportion | % | 15 | 15 | 15 | 15 | | 15 | 15 | 15 | 15 | 15 |
| Constituent fiber 3 | | | | | | | | | | | |
| Polymer | | Cellulose | Cellulose | Cellulose | Cellulose | | Cellulose | Cellulose | Cellulose | Cellulose | Cellulose |
| Fiber breaking temperature in heated water | ° C. | — | — | — | — | | — | — | — | — | — |
| Fineness | dtex | 1.7 | 1.7 | 1.7 | 1.7 | | 1.7 | 1.7 | 1.7 | 1.7 | 1.7 |
| Fiber length | mm | 3 | 3 | 3 | 3 | | 3 | 3 | 3 | 3 | 3 |
| Beating degree | ml | 10 | 10 | 50 | 10 | | 10 | 10 | 50 | 50 | 10 |
| Blend proportion | % | 35 | 35 | 45 | 35 | | 35 | 35 | 65 | 85 | 35 |

TABLE 2

| | | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Basis weight | g/m$^2$ | 10.3 | 9.8 | 10.1 | 7.1 | 9 | 8 | 10.2 | 10.3 | 10.3 | — |
| Thickness | μm | 13 | 12 | 25 | 9 | 20 | 20 | 15 | 13 | 13 | — |
| Density | g/m$^3$ | 0.79 | 0.82 | 0.40 | 0.79 | 0.45 | 0.40 | 0.68 | 0.79 | 0.79 | — |
| Tensile strength | kg/15-mm | 1.6 | 1.2 | 1.7 | 1.1 | 7 | 0.28 | 0.71 | 0.62 | 0.44 | — |
| Piercing strength | g | 112 | 93 | 118 | 76 | 360 | 14 | 88 | 37 | 28 | — |

TABLE 2-continued

|  |  | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Air permeability | cc/cm²/sec | 8.7 | 6 | 14.6 | 43.7 | 0.2 | 56.3 | 16.4 | 2.8 | 1.7 | — |
| Resistance value | Ω | 3.6 | 3.9 | 4.1 | 2.7 | 6 | 2.8 | 3 | 4.2 | 4.6 | — |
| Strength/thickness |  | 0.123 | 0.100 | 0.068 | 0.122 | 0.350 | 0.014 | 0.047 | 0.048 | 0.034 | — |

TABLE 3

|  | Strength (kg/15-mm) of sample after having stored in an impregnated state with electrolytic solution |
|---|---|
| Example 1 | 0.2 |
| Comparative Example 4 | 0.031 |

(1) In Example 1, the obtained sheet (separator) had excellent strength properties per thickness and air permeability because of blending the cellulose fiber (constituent fiber 3), and the polyvinyl alcohol binder fiber (constituent fiber 2) with the polyvinyl alcohol fiber (constituent fiber 1) (blend proportion: 50%) of a fiber breaking temperature in heated water of 95° C.

(2) In Example 2, even when the beating degree of the cellulose fiber was increased (from 10 mL to 50 mL), the blend proportion thereof was increased from 35% to 45%, and the blend proportion of the constituent fiber 1 was lowered from 50% to 40%, the sheet had the features of the present invention (the strength properties per thickness were excellent and further the air permeability was excellent).

(3) In Example 3, the sheet formed in the same way as in Example 1 except for having bulky structure, the strength/thickness ratio was lowered, but the strength itself was maintained and the air permeability was increased.

(4) In Example 4, the sheet formed by use of the same constituent fibers as in Example 1 except for having reduced thickness was a sheet of which the strength properties were maintained while the air permeability was high.

(5) In Comparative Example 1, when the polyethylene film was used as a separator, the separator had a drawback that the air permeability was very low although the strength properties were excellent.

(6) In Comparative Example 2, in the fiber sheet in which the acetate fiber was blended in the proportion of 50%, the adhesion between the fibers was weak and the strength/thickness ratio was 0.014. It was determined that the fiber sheet had not reached up to a practical level.

(7) In Comparative Example 3, the sheet formed by blending the polyvinyl alcohol fiber (formalized fiber) having a fiber breaking temperature in heated water of 100° C. or higher was poor in strength properties and strength/thickness ratio although the sheet gained air permeability.

(8) In Comparative Example 4, in the case of blending the polyvinyl alcohol fiber (unformalized fiber) having a fiber breaking temperature in heated water of 95° C. in the proportion of 20% and increasing the beating degree of the cellulose fiber (50 mL), the obtained sheet showed poor air permeability, and further showed that the strength of the sheet after impregnation with the electrolytic solution deteriorated compared to the strength of the sheet before impregnation probably because the blend proportion of the polyvinyl alcohol was smaller than that in Example 1.

(9) In Comparative Example 5, the sheet formed by bonding the cellulose fibers (beating degree: 10 mL) with the polyvinyl alcohol binder fibers indicated that not only the strength properties but also air permeability was low.

(10) In Comparative Example 6, when the polyvinyl alcohol fiber having a fiber breaking temperature in heated water of 80° C. or lower occupied the proportion of 65% of the sheet, the sheet was unobtainable because the wet paper obtained with the papermaking machine could not be tolerant to heat-dry process, resulting in difficulty in producing a sheet in a stable manner.

Example 5

The following constituent fibers 1, 2 and 3 were mixed with blend proportions (% by mass) of 40%, 20%, and 40%, respectively, to prepare a slurry:

as a constituent fiber 1, a polyvinyl alcohol (PVA) fiber (unformalized fiber) having a fiber breaking temperature in heated water of 95° C., a fineness of 0.3 dtex, and a fiber length of 2 mm (trade name: "VN 20200", manufactured by Kuraray Co., Ltd.);

as a constituent fiber 2, a polyvinyl alcohol fiber having a fiber breaking temperature in heated water of 72° C., a fineness of 1.1 dtex, and a fiber length of 3 mm (trade name: "VPB 105-1", manufactured by Kuraray Co., Ltd.); and as a constituent fiber 3, a pulverized glass fiber (average fiber diameter: 0.33 μm) obtained by pulverizing a glass fiber (product name: "B-00-F" manufactured by Lauscha Fiber International Corp.) in the following pulverizing manner, i.e., a slurry containing the glass fiber in a proportion of 1% by weight was processed in an attritor, MA1SC model (manufactured by Mitsui Miike Machinery Co., Ltd.) filled with ceramic balls having a diameter of 5 mm for 2 hours to give a glass fiber having a maximum fiber diameter of 6 μm). A cylinder papermaking machine was used to make the slurry into a wet paper. After the papermaking, a dryer was used to dry the paper (dryer temperature: 130° C.). Next, a heat press machine was used to process the paper at a processing temperature of 200° C. and a linear pressure of 100 kgf/cm. In this way, a sheet was produced having a basis weight of 10.3 g/m², a thickness of 15 μm, and a density of 0.69 g/m³.

Example 6

The blend proportion of the constituent fiber 3 was changed from 40% in Example 5 to 30%. Except this change, the same constituent fibers 1 to 3 as in Example 5 were used to be mixed with each other with blend proportions of 50%, 20%, and 30%, respectively, to prepare a slurry. In the same manner as in Example 5, the slurry was made into a wet paper, and after the papermaking, the wet paper was dried with a dryer and then processed through a heat press machine to produce a sheet having a basis weight of 9.8 g/m², a thickness of 15 μm, and a density of 0.65 g/m³.

Example 7

The constituent fibers 1, 2 and 3 were mixed with each other with the same blend proportions as in Example 5 except that the glass fiber to be pulverized as the constituent fiber 3 was changed to a glass fiber (average fiber diameter: 0.46 μm) (product name: "B-02-F" manufacturing maker: Lauscha Fiber International Corp.) to prepare a slurry. In the same manner as in Example 5, the slurry was made into a wet paper with the papermaking machine. The wet paper was dried with a dryer and then processed through a heat press machine to produce a sheet having a basis weight of 10.1 g/m², a thickness of 15 μm, and a density of 0.67 g/m³. The adjustment of the thickness was attained by adjusting the clearance of the heat press machine.

Example 8

The same constituent fibers 1, 2 and 3 as in Example 5 were used to be mixed with each other with the same blend proportions as in Example 5, to prepare a slurry. In the same manner as in Example 5, the slurry was made into a wet paper, and then the wet paper was dried with a dryer except that the linear pressure of the heat press machine was changed to 40 kgf/cm for processing to produce a sheet which had a basis weight of 14.9 g/m², a thickness of 20 μm, and a density of 0.75 g/m³.

Example 9

The constituent fibers 1, 2 and 3 were mixed with each other with the same blend proportions as in Example 5 except that the glass fiber to be pulverized as the constituent fiber 3 was changed to a glass fiber (product name: "B-15-F", average fiber diameter: 1.4 μm; manufacturing maker: Lauscha Fiber International Corp.) to prepare a slurry. In the same manner as in Example 5, the slurry was made into a wet paper with the papermaking machine. The wet paper was dried with a dryer and then processed through a heat press machine to produce a sheet having a basis weight of 9.7 g/m², a thickness of 15 μm, and a density of 0.65 g/m³.

Example 10

The blend proportion of the constituent fiber 3 was changed from 40% in Example 5 to 10%. Except this change, the same constituent fibers 1 to 3 as in Example 5 were used to be mixed with each other with blend proportions of 70%, 20% and 10%, respectively, to prepare a slurry. In the same manner as in Example 5, the slurry was made into a wet paper with the papermaking machine, followed by dried with a dryer and then processed through a heat press machine to produce a sheet having a basis weight of 10.8 g/m², a thickness of 15 μm, and a density of 0.72 g/m³.

Comparative Example 7

A polyvinyl alcohol fiber (formalized fiber) having a fiber breaking temperature in heated water of 100° C. or higher, a fineness of 0.3 dtex, and a fiber length of 2 mm (trade name: "VN 30200", manufactured by Kuraray Co., Ltd.) was used as a constituent fiber 1. The constituent fiber 1 and the same constituent fibers 2 and 3 as used in Example 5 were mixed with blend proportions of 40%, 20%, and 40%, respectively, to prepare a slurry. A cylinder papermaking machine was used to make the slurry into a wet paper. After the papermaking, the wet paper was dried with a dryer and then processed through a heat press machine to produce a sheet having a basis weight of 10.4 g/m², a thickness of 15 μm, and a density of 0.69 g/m³.

Comparative Example 8

The blend proportion of the constituent fiber 3 in Example 5 was changed from 40% to 60%. Except for this change, the same constituent fibers 1 to 3 as in Example 5 were used to be mixed with each other with blend proportions of 20%, 20% and 60%, respectively, to prepare a slurry. In the same manner as in Example 5, the slurry was made into a wet paper with the papermaking machine, followed by being dried with a dryer and then processed through a heat press machine to produce a sheet having a basis weight of 10.6 g/m², a thickness of 15 μm, and a density of 0.71 g/m³.

Table 4 shows formulation of the constituent fibers constituting the sheet in Examples 5 to 10 and Comparative Examples 7 and 8. Table 5 shows performances (the tensile strength, piercing strength, air permeability, resistance value, and tensile strength/thickness ratio) of the sheet in Examples 5 to 10 and Comparative Examples 7 and 8. Table 6 shows strength of each sheet of Examples 5 and 9 after having stored in an impregnated state with electrolytic solution.

TABLE 4

| | | Example 5 | Example 6 | Example 7 | Example 8 | Example 9 | Example 10 | Comparative Example 7 | Comparative Example 8 |
|---|---|---|---|---|---|---|---|---|---|
| Constituent fiber 1 | | | | | | | | | |
| Component (polymer) | | PVA | PVA | PVA | PVA | PVA | PVA | PVA | PVA |
| Fiber breaking temperature in heated water | ° C. | 95 | 95 | 95 | 95 | 95 | 95 | 100 or more | 95 |
| Fineness | dtex | 0.3 | 0.3 | 0.3 | 0.3 | 0.3 | 0.3 | 0.3 | 0.3 |
| Fiber length | mm | 2 | 2 | 2 | 2 | 2 | 2 | 2 | 2 |
| Blend proportion | % | 40 | 50 | 40 | 40 | 40 | 70 | 40 | 20 |
| Constituent fiber 2 | | | | | | | | | |
| Component (polymer) | | PVA | PVA | PVA | PVA | PVA | PVA | PVA | PVA |
| Fiber breaking temperature in heated water | ° C. | 72 | 72 | 72 | 72 | 72 | 72 | 72 | 72 |
| Fineness | dtex | 1.1 | 1.1 | 1.1 | 1.1 | 1.1 | 1.1 | 1.1 | 1.1 |
| Fiber length | mm | 3 | 3 | 3 | 3 | 3 | 3 | 3 | 3 |
| Blend proportion | % | 20 | 20 | 20 | 20 | 20 | 20 | 20 | 20 |
| Constituent fiber 3 | | | | | | | | | |
| Component | | Glass | Glass | Glass | Glass | Glass | Glass | Glass | Glass |
| Average fiber diameter | μm | 0.33 | 0.33 | 0.46 | 0.33 | 1.4 | 0.33 | 0.33 | 0.33 |
| Freeness *1 | ml | 840 | 840 | 770 | 840 | 273 | 840 | 840 | 840 |

TABLE 4-continued

|  |  | Example 5 | Example 6 | Example 7 | Example 8 | Example 9 | Example 10 | Comparative Example 7 | Comparative Example 8 |
|---|---|---|---|---|---|---|---|---|---|
| Maximum fiber diameter *2 | μm | 6 | 6 | 9 | 6 | 20 | 6 | 6 | 6 |
| Blend proportion | % | 40 | 30 | 40 | 40 | 40 | 10 | 40 | 60 |

(Notes)
*1 and *2: values after pulverizing treatment

|  |  | Example 5 | Example 6 | Example 7 | Example 8 | Example 9 | Example 10 | Comparative Example 7 | Comparative Example 8 |
|---|---|---|---|---|---|---|---|---|---|
| Basis weight | g/m$^2$ | 10.3 | 9.8 | 10.1 | 14.9 | 9.7 | 10.8 | 10.4 | 10.6 |
| Thickness | μm | 15 | 15 | 15 | 20 | 15 | 15 | 15 | 15 |
| Density | g/m$^3$ | 0.69 | 0.65 | 0.67 | 0.75 | 0.65 | 0.72 | 0.69 | 0.71 |
| Tensile strength | kg/15-mm | 0.7 | 0.8 | 0.7 | 1.1 | 0.6 | 1.1 | 0.5 | 0.4 |
| Air permeability | cc/cm$^2$/sec | 0.8 | 1.6 | 1.3 | 0.6 | 3.8 | 18 | 1 | 0.5 |
| Average void size | μm | 0.9 | 1.8 | 1.6 | 0.6 | 2.9 | 11 | 1.3 | 0.7 |

TABLE 6

| | Strength (kg/15-mm) of sample after having stored in an impregnated state with electrolytic solution |
|---|---|
| Example 5 | 0.07 |
| Example 9 | 0.065 |

(1) In Example 5, the sheet (separator) was excellent not only in strength properties but also in air permeability because of blending the polyvinyl alcohol binder fiber (constituent fiber 2) (blend proportion: 20%) with the polyvinyl alcohol fiber (constituent fiber 1) (blend proportion: 40%) having a fiber breaking temperature in heated water of 95° C., and further with the glass fiber (constituent fiber 3) (blend proportion: 40%) having the average fiber diameter of 0.33 μm and the maximum fiber diameter of 6 μm. Although the strength of the sheet after impregnation with the electrolytic solution deteriorated compared to the strength of the sheet before impregnation, the degree of decrease was similar to that of Example 1, in which the blend proportion of the polyvinyl alcohol was similar.

(2) In Example 6, even when the blend proportion of the constituent fiber 1 was increased from 40% to 50%, and that of the constituent fiber 3 was decreased from 40% to 30% compared to Example 5, the sheet still had the features of the present invention (the strength properties per thickness and the air permeability were excellent).

(3) In Example 7, when the sheet was formed in the same way as in Example 5 except that the average fiber diameter of the constituent fiber 3 was changed to 0.46 μm, the strength and the air permeability of the sheet were in the same degree with Example 5.

(4) In Example 8, the sheet formed by use of the same constituent fibers as in Example 5 except for increase in basis weight as well as thickness had improved strength properties compared to Example 5.

(5) In Example 9, the fiber sheet in which as the constituent fiber 3, the glass fiber having the average fiber diameter of 1.4 μm was blended in the proportion of 40% was also a favorable sheet.

(6) In Example 10, the sheet formed by increasing the blend proportion of the constituent fiber 1 to 70% and changing the blend proportion of the constituent fiber 3 from 40% to 10% compared to Example 5 had increased air permeability, but was still usable as a separator.

(7) In Comparative Example 7, the sheet gained air permeability, but was poor in strength properties because of blending the polyvinyl alcohol fiber (formalized fiber) having a fiber breaking temperature in heated water of 100° C. or higher.

(8) In Comparative Example 8, when the polyvinyl alcohol fiber (unformalized fiber) having a fiber breaking temperature in heated water of 95° C. was blended as a constituent fiber 1 in the proportion of 20%, the resultant sheet was poor in air permeability.

INDUSTRIAL APPLICABILITY

According to the present invention, the separator for a nonaqueous cell makes it possible to have a reduced thickness so as to improve performances of the nonaqueous cell. Thus, the separator is industrially applicable.

As described above, the present invention has been specifically described while embodiments and working examples thereof have been demonstrated. However, those skilled in the art would be able to suppose various changes and modifications of the embodiments and the examples easily within a self-evident range with reference to the present specification. Accordingly, such changes and modifications are interpreted to be within the scope of the present invention, which is specified by the claims.

What is claimed is:

1. A separator, comprising a fiber sheet comprising a plurality of polyvinyl alcohol fibers A in a proportion of 30% or more by mass, based on a mass of the fiber sheet, the fibers A having a fiber breaking temperature in heated water of lower than 100° C. and higher than 85° C.,
   wherein the plural fibers A are bonded to one another on their surfaces at crossing points while maintaining a fiber structure, and
   wherein the fiber breaking temperature is measured by connecting a weight giving a load of 0.9 gf/500 dtex to a polyvinyl alcohol fiber A having a test length of 5 cm, hanging the weighted fiber in 500 cc of 20° C. water, then increasing the water temperature at a rate of 1° C./minute until the weighted fiber breaks, wherein the fiber breaking temperature is the temperature of the water when the weighted fiber breaks.

2. The separator according to claim 1, wherein the fiber sheet further comprises a polyvinyl alcohol fiber B having a fiber breaking temperature in heated water of lower than 80° C.

3. The separator according to claim 1, wherein the fiber sheet further comprises a glass fiber.

4. The separator according to claim 2, wherein the fiber sheet further comprises a glass fiber.

5. The separator according to claim 3, wherein the glass fiber is a pulverized glass fiber having a maximum fiber diameter of 30 μm or less, and an average fiber diameter of 0.1 to 1.0 μm; and the glass fiber is incorporated in a proportion of 20 to 50% by mass, based on the mass of the fiber sheet.

6. The separator according to claim 3, wherein the separator has a thickness of 9 to 30 μm, a density of 0.6 to 1.0 g/cm$^3$, and a strength of 0.6 kg/15 mm or more in a longitudinal direction thereof.

7. The separator according to claim 3, wherein the glass fiber is a physically pulverized glass fiber.

8. The separator according to claim 3, wherein the glass fiber is a glass fiber subjected to a pulverizing treatment which is a wet-pulverizing treatment.

9. The separator according to claim 1, wherein the fiber sheet further comprises a cellulose fiber.

10. The separator according to claim 2, wherein the fiber sheet further comprises a cellulose fiber.

11. The separator according to claim 9, wherein the cellulose fiber is a beaten product from an organic-solvent-spun cellulose fiber or a natural cellulose fiber.

12. The separator according to claim 10, wherein the cellulose fiber is a beaten product from an organic-solvent-spun cellulose fiber or a natural cellulose fiber.

13. The separator according to claim 9, satisfying the following requirements (1) and (2):
    (i) the separator has a thickness ranging from 5 to 30 μm, and
    (ii) a quantity of (the strength (Kg/15 mm) in a longitudinal direction of the separator)/(the thickness (μm) thereof)>0.05.

14. The separator according to claim 10, satisfying the following requirements (1) and (2):
    (i) the separator has a thickness ranging from 5 to 30 μm, and
    (ii) a quantity of (the strength (Kg/15 mm) in a longitudinal direction of the separator)/(the thickness (μm) thereof)>0.05.

15. A nonaqueous cell, comprising the separator according to claim 1.

* * * * *

UNITED STATES PATENT AND TRADEMARK OFFICE
CERTIFICATE OF CORRECTION

PATENT NO. : 9,748,543 B2
APPLICATION NO. : 14/553563
DATED : *August 29, 2017
INVENTOR(S) : Tomohiro Hayakawa et al.

It is certified that error appears in the above-identified patent and that said Letters Patent is hereby corrected as shown below:

On the Title Page

The Terminal Disclaimer information has been omitted. Item (45) and the Notice information should read:

--(*) Notice: Subject to any disclaimer, the term of this patent is extended or adjusted under 35 U.S.C. 154(b) by 106 days.

This patent is subject to a terminal disclaimer.

(45) Date of Patent: *August 29, 2017--

Signed and Sealed this
Twenty-fourth Day of April, 2018

Andrei Iancu
*Director of the United States Patent and Trademark Office*